(12) United States Patent
Connolly, Jr. et al.

(10) Patent No.: US 11,532,013 B2
(45) Date of Patent: Dec. 20, 2022

(54) OPTIMIZED SIMULTANEOUS USE OF CONTENT EXPERIMENTATION AND CONTENT CACHING

(71) Applicant: Optimizely, Inc., San Francisco, CA (US)

(72) Inventors: Michael James Connolly, Jr., San Francisco, CA (US); Lauren Pappone, Berkeley, CA (US); Michael Hood, San Francisco, CA (US); Asa Schachar, San Francisco, CA (US)

(73) Assignee: OPTIMIZELY, INC., Palo Alto, CA (US)

( * ) Notice: Subject to any disclaimer, the term of this patent is extended or adjusted under 35 U.S.C. 154(b) by 0 days.

(21) Appl. No.: 16/443,666

(22) Filed: Jun. 17, 2019

(65) Prior Publication Data

US 2020/0394679 A1    Dec. 17, 2020

(51) Int. Cl.
  *G06Q 30/00*  (2012.01)
  *G06Q 30/02*  (2012.01)
  *G06F 16/955*  (2019.01)
  *G06F 16/957*  (2019.01)
  *H04L 67/63*  (2022.01)
  *H04L 67/568*  (2022.01)

(52) U.S. Cl.
  CPC ....... *G06Q 30/0243* (2013.01); *G06F 16/955* (2019.01); *G06F 16/9574* (2019.01); *H04L 67/568* (2022.05); *H04L 67/63* (2022.05)

(58) Field of Classification Search
  CPC .......... G06Q 30/0277; G06Q 30/0269; G06Q 30/02; G06Q 30/0243; G06F 16/9574; G06F 16/955; H04L 67/2842; H04L 67/327
  See application file for complete search history.

(56) References Cited

U.S. PATENT DOCUMENTS

| | | | | |
|---|---|---|---|---|
| 7,260,783 B1 | | 8/2007 | Mika | |
| 8,417,966 B1 * | | 4/2013 | Mooneyham | H04L 9/3236 713/192 |
| 8,495,288 B2 * | | 7/2013 | Hosoya | G06F 3/061 711/216 |
| 8,607,335 B1 * | | 12/2013 | Liu | G06F 21/567 713/188 |
| 8,813,117 B1 * | | 8/2014 | Inskip, VI | H04N 21/435 725/31 |
| 9,208,167 B1 * | | 12/2015 | Henderson | G06F 16/1774 |

(Continued)

OTHER PUBLICATIONS

Gomes; A_mobile_follow-me_cloud_content_caching_model; IEEE 2916; pp. 763-766; 2016.*

(Continued)

*Primary Examiner* — Radu Andrei
(74) *Attorney, Agent, or Firm* — Womble Bond Dickinson (US) LLP

(57) ABSTRACT

A method includes receiving, from a computing device, a request for content hosted by a content provider and determining one or more experiment variations for the requested content that the computing device is assigned to based, at least in part, on the request. The method further includes generating, by a processing device, a hash value of the one or more experiment variations and transmitting the hash value to the computing device and to a caching server.

11 Claims, 8 Drawing Sheets

(56) References Cited

U.S. PATENT DOCUMENTS

| | | | |
|---|---|---|---|
| 9,379,932 B1* | 6/2016 | Bakar | H04L 65/613 |
| 9,401,949 B1* | 7/2016 | Kolam | H04L 67/568 |
| 10,459,822 B1* | 10/2019 | Gondi | G06F 8/75 |
| 2002/0100058 A1* | 7/2002 | Hirose | G06F 16/955 |
| | | | 707/E17.112 |
| 2007/0245137 A1* | 10/2007 | Bhagat | H04L 67/146 |
| | | | 713/153 |
| 2008/0275980 A1 | 11/2008 | Hansen | |
| 2010/0083163 A1* | 4/2010 | Maghoul | G06F 1/1626 |
| | | | 715/781 |
| 2010/0218177 A1* | 8/2010 | Miura | G06F 8/65 |
| | | | 717/170 |
| 2011/0179075 A1* | 7/2011 | Kikuchi | G06F 16/93 |
| | | | 707/769 |
| 2014/0201258 A1* | 7/2014 | Jowett | H04L 67/568 |
| | | | 709/203 |
| 2015/0324178 A1* | 11/2015 | Arnold | G06F 8/48 |
| | | | 717/121 |
| 2015/0339330 A1* | 11/2015 | Zarn | H04L 67/303 |
| | | | 707/695 |
| 2016/0063568 A1* | 3/2016 | Brill | G06Q 30/0269 |
| | | | 705/14.66 |
| 2016/0218881 A1* | 7/2016 | Adams | H04L 9/3239 |
| 2017/0046110 A1 | 2/2017 | He et al. | |
| 2017/0083429 A1 | 3/2017 | Pekelis et al. | |
| 2017/0094341 A1* | 3/2017 | Berner | H04N 21/8352 |
| 2018/0012131 A1* | 1/2018 | Tseng | G06Q 10/10 |
| 2018/0181484 A1 | 6/2018 | Jambu et al. | |
| 2018/0232394 A1* | 8/2018 | Danziger | G06F 16/1873 |
| 2018/0300330 A1* | 10/2018 | Samwel | G06F 16/2456 |
| 2019/0066151 A1* | 2/2019 | Michaeli | G06F 3/167 |
| 2020/0128095 A1 | 4/2020 | Godinez et al. | |

OTHER PUBLICATIONS

Shafiq; Characterizing_caching_workload_of_a_large_commercial_CDN; IEEE2016; 9 mpages; 2016.*

* cited by examiner

OPTIMIZED SIMULTANEOUS USE OF CONTENT EXPERIMENTATION AND CONTENT CACHING

FIELD OF TECHNOLOGY

The embodiments described herein pertain in general to conducting content experiments on a web page or digital product and more particularly, to efficiently caching experimental content.

BACKGROUND

Content variation testing is a type of experiment that tests changes to content against a current version of the content. One example of content variation testing is web page variation testing where an experiment is conducted that tests a web page (or one or more elements on the page) against another design of the web page (or one or more variations of the elements on the page). During variation testing of a web page, user interaction with a web page or its variations are measured (for example, whether a user clicks through a button or a variation of a button), and the changes to a web page (or its elements) that produce positive or negative results are determined. The positive results associated with a particular change to a web page validates that the change to the web page should be used in a production version of the web page. Another example of content variation is personalization. Personalization refers to delivering content variations to different audiences based on different criteria, such as characteristics of or information retrieved from a particular device or user.

Figure 1A:
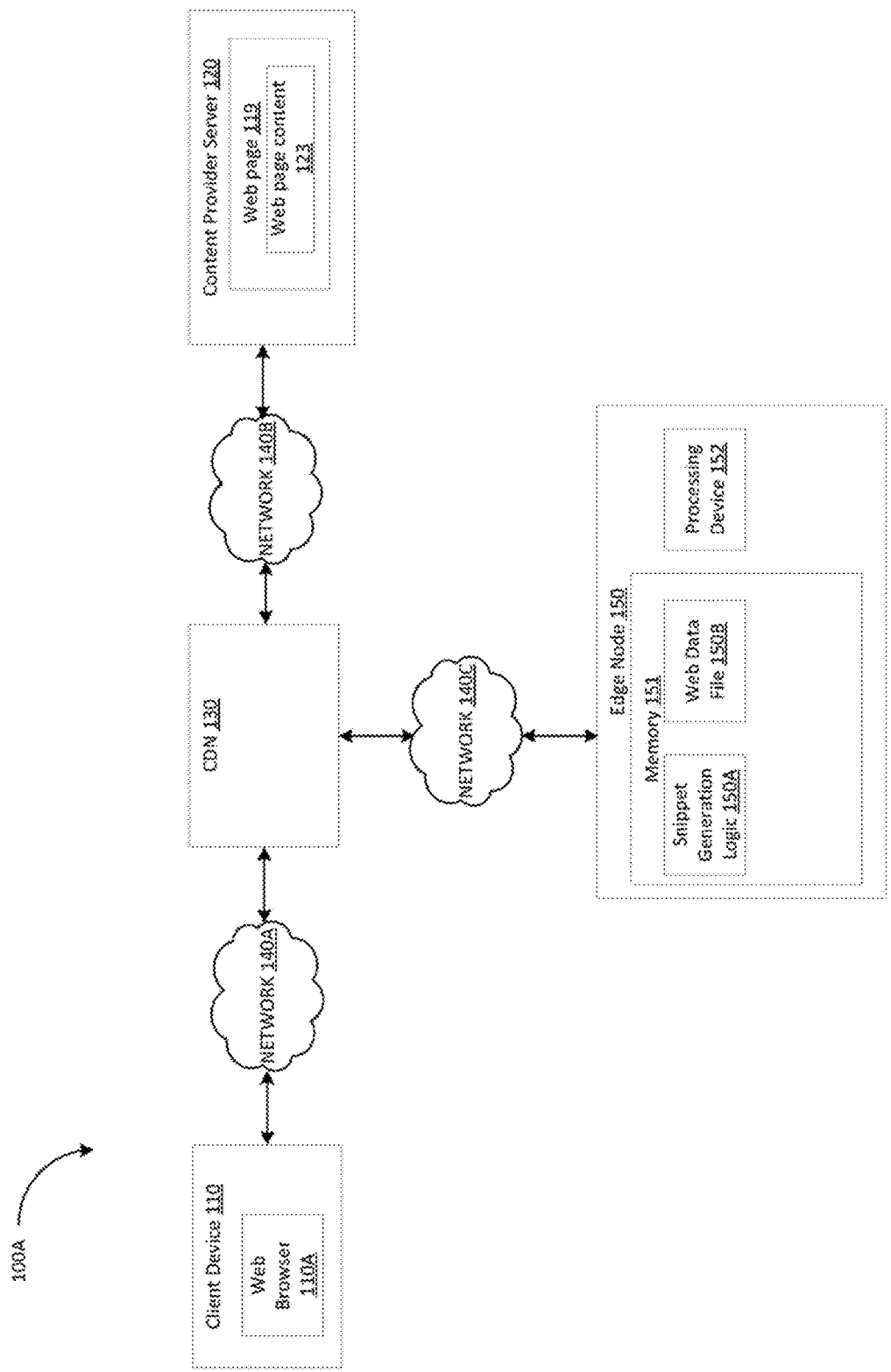
FIG. 1A is a block diagram of a variant testing system environment, in accordance with some embodiments of the present disclosure.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Content providers may run content experiments such as A/B tests to answer specific questions regarding which variation of a web page or digital product (including various features of, or other content items in such pages or products) are more successful. Content providers may also use personalization campaigns to personalize web pages or digital products (including various features of or other content items in such pages or products) so that a different user or group of users receives different variations of a web page or digital product. Many content experiments include targeting criteria that is used to determine whether a visitor is eligible for the experiment. A hashing function may optionally be used to split the visitor traffic into different groups, or buckets, of visitors, where each bucket is assigned to a different variation of the experiment. When this system is used to personalize the content of a web page, rather than assigning visitors randomly to experiment variations, visitor targeting criteria may be used to determine which variations of the content campaign should be shown to the visitor. For ease of reference, the term content experiment or experiment may include content testing, such as A/B experiments, content personalization, and other situations where content variations may need to be delivered to a client device or between computing devices.

The systems that implement these content experiments may be implemented in the backend of the content provider's system or as a separate system that communicates with the back end of the content provider's system. Simultaneously, content providers may bring up content delivery networks (CDNs) to provide for content caching, including caching of content experiment variations. The delivery of content variations such as content experiments and/or content experiment variations to different users poses a challenge for caching and delivering such content variations efficiently. As the number of content experiments and the number of variations of each experiment grows, the amount of content the CDNs must cache increases proportionally, resulting in a trade-off between the amount of experiments that can be run and the amount of content that can be cached.

Advantageously, the embodiments described herein provide efficient solutions to the above, and other problems by providing systems and methods for generation of one or more hash values representing one or all of the variations that a visitor of a content provider would potentially receive, as further discussed herein. The hash value may be saved on a cookie, which may be stored on a browser of the visitor's device (for example, as a browser cookie) and also stored on a CDN of the content provider. The CDN may use the hash value to cache at the CDN the variations of content that the visitor would see (e.g., that the visitor would be assigned to based on the targeting criteria for the content experiments). The hash value may also be stored on a database or file on the servers of the content provider.

FIG. 1A is a block diagram of a variant testing system environment 100A according to one embodiment. Environment 100A may include client device 110, content provider server 120, content delivery network (CDN) 130 and edge node 150. In one embodiment, client device 110 is a device of a visitor to a website hosted by content provider server 120. Client device 110 is connected to CDN 130 via a network 140A. In turn, CDN 130 is connected to content provider server 120 by network 140B. In addition, CDN 130 is connected to edge node 150 by network 140C. Although the environment 100A shown in FIG. 1A only includes client device 110, the environment 100A may include any number of client devices (e.g., thousands of client devices 110).

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

Client device 110 may include hardware such as processing devices (not shown) (e.g., processors, central processing units (CPUs) and memory (e.g., random access memory (RAM), storage devices (e.g., hard-disk drive (HDD), solid-state drive (SSD), etc.), and other hardware devices (e.g., sound card, video card, etc.). The memory may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The memory may be configured for long-term storage of data and may retain data between power on/off cycles of the client device 110.

Each network 140 enables communication among the entities connected to it. In one embodiment, network 140 is the Internet and uses standard communications technologies and/or protocols. Thus, network 140 can include links using technologies such as Ethernet, 802.11 (WiFi™), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 140 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client device 110 may communicate with the content provider server 120 via the network 140 to receive content items such as web pages from the content provider server 120. In one embodiment, client device 110 is a computer system capable of communicating with the content provider server 120. Examples of client device 110 include a personal computer, a mobile phone, a tablet, a personal digital assistant (PDA), or a laptop. As shown in FIG. 1A, client device 110 includes a web browser 110A. Web browser 110A is a computer program stored on client device 110 that allows client device 110 to access web pages on the World Wide Web, such as web pages provided by the content provider server 120.

As mentioned above, the environment 100A includes a content provider server 120. Hereinafter, the content provider server 120 is referred to as a "content provider 120" for ease of description. The content provider 120 may be an individual, a group of individuals, or an entity such as a company. In one embodiment, the content provider 120 provides content items to client device 110. While only one content provider 120 is shown, it is understood that any number of content providers are supported and can be in the environment 100A at any time.

Content provider 120 may include hardware such as processing devices (not shown) (e.g., processors, central processing units (CPUs)) and memory (e.g., random access memory (RAM), storage devices (e.g., hard-disk drive (HDD), solid-state drive (SSD), etc.). The memory may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The memory may be configured for long-term storage of data and may retain data between power on/off cycles of the client device 110.

In one embodiment, the content items provided by the content provider 120 include web pages. However, the content provider 120 may provide other types of content items (e.g., digital content) such as software applications, including web applications, mobile device applications, etc. The web pages and software applications may include video, audio, a combination of video and audio, still images (e.g., JPEG), text documents, advertisements, features (e.g. a navigation menu), and/or any other types of content. For purposes of convenience and the description of one embodiment, the content items provided by the content provider 120 will be referred to as web pages, but no limitation on the type of content items are intended by this terminology.

The environment 100A also includes CDN 130 which may comprise a geographically distributed network of servers that cache content hosted by the content provider 120 at the edge of network 140A, thereby providing faster loading and delivery of content hosted by content provider 120 to client device 110. CDN 130 may be geographically remote from content provider 120. For example, CDN 130 may be physically located closer to client device 110 to allow for faster delivery of content to client device 110. In some embodiments, CDN 130 may be any CDN that supports edge side include (ESI) expressions, which may instruct, the CDN 130 to perform a particular action(s) and may be embedded within content retrieved from content provider 120. ESI is a markup language that may be used to instruct edge applications to communicate with edge workers at the edge of a network rather than a browser, for example.

In one embodiment, the content provider 120 includes web pages 119, and web page content 123. The content provider 120 may display different variations of a web page, including different features, to client device 110 based on instructions from a variation testing system (not shown) that is conducting content experiments on the web page for the content provider 120. The variation testing system may be implemented in the content provider 120 itself, as part of a separate system, or in some embodiments, implemented on edge node 150. A content experiment for a web page may test changes to the web page against the current variation of the web page to determine how different variations alter visitor interaction, or some other metric, with the web page or whether the changes produce a desired result. An example of a desired result resulting from a change to a web page is an increased selection of an advertisement(s) included in the web page or increased purchases of a product advertised on a web page. Thus, content experimentation can be used to validate a new design of a web page or changes on elements on the web page before the new design or changes are put into production by the content provider 120.

For a given web page, the content provider 120 may have one or more variations of the web page that are used in a content experiment for the web page. In one embodiment, a content experiment of a web page involves an experiment that tests an "A" variation known as the control and a "B" variation known as the variant on visitors requesting the web page from the content provider 120. For ease of discussion, the embodiments discussed with respect to FIGS. 2A and 2B describe a web page experiment having only two variations: the control and the variant. However, in other embodiments, a web page experiment can have any number of variants.

Figure 2B:
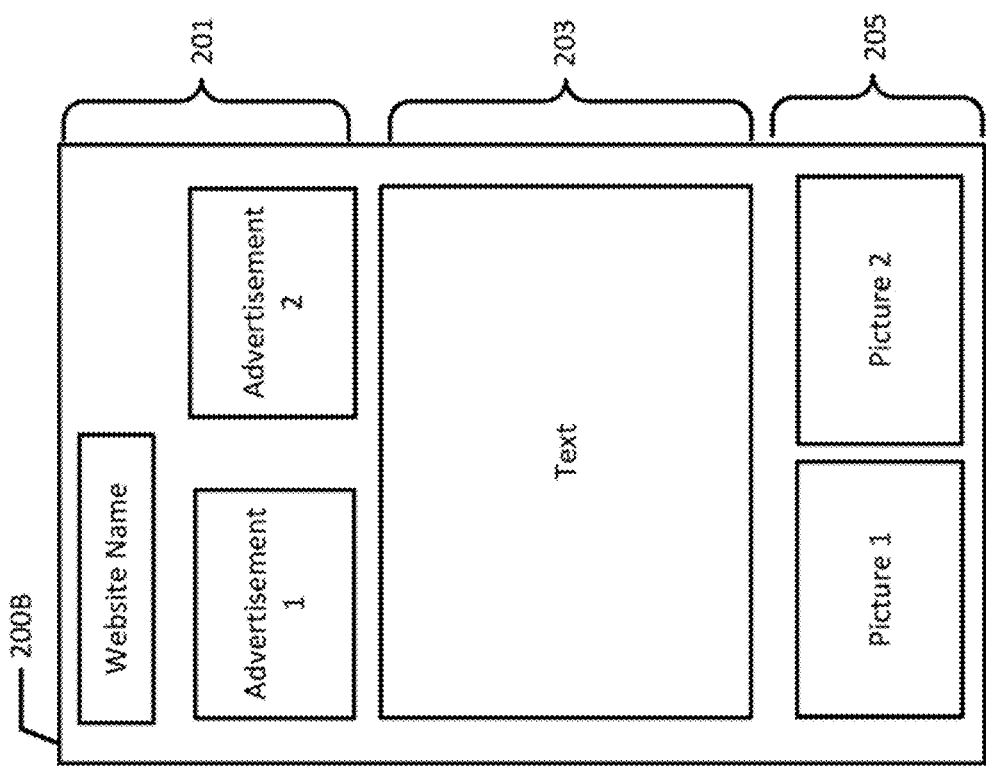
FIGS. 2A and 2B are example variations of a content experiment on a web page, in accordance with some embodiments of the present disclosure.
Figure 2A:
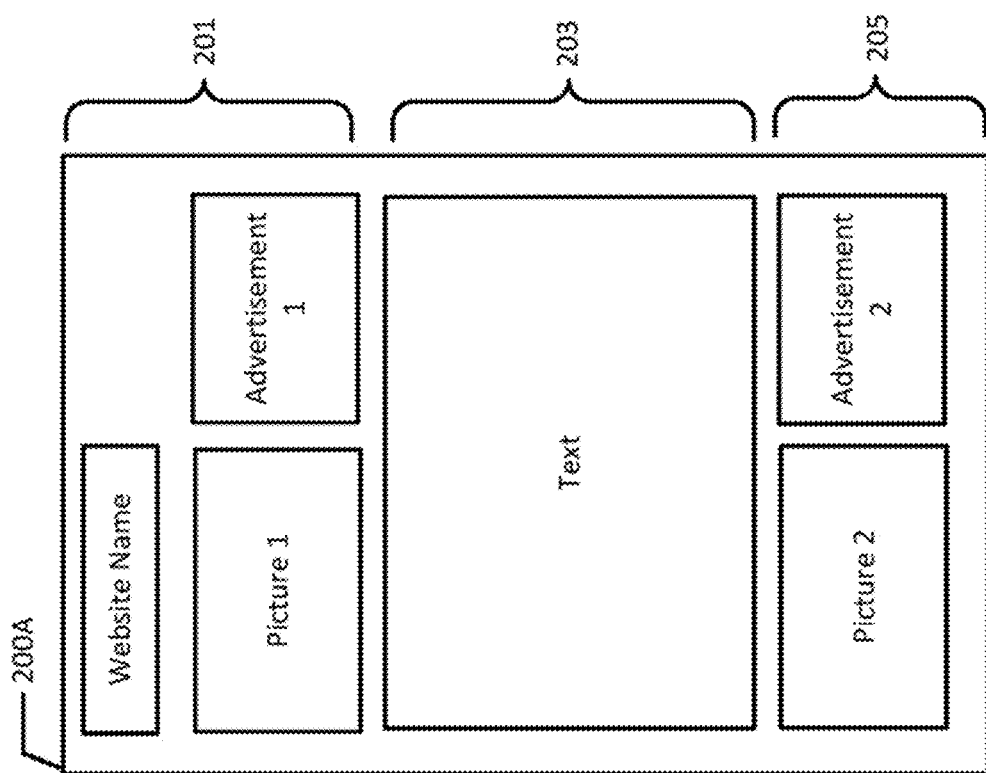

FIG. 2A is an example of an "A" variation (e.g., the control variation) of a web page 200A that represents the current implementation of the web page provided by content provider 120. The control variation of the web page 200A includes a website name of the website associated with the web page, a first picture, and a first advertisement. The website name, the first picture, and the first advertisement are located in an upper portion 201 of the control variation of web page 200A according to one embodiment. The control variation of web pave 200A also includes textual content located in a central portion 203 of the control variation of web page 200A and the control variation of the web page 200A also includes a second picture and a second advertisement located at a lower portion 205 of the control variation of the web pave 200A.

FIG. 2B is an example of a "B" variation (e.g., the variant version) of a web page 200B. The variant version of the web page represented by web page 200B includes a change (i.e., a modification) to the control version of the web page 200A shown in FIG. 2A. The variant version of web page 200B includes the website name, a first advertisement, a second advertisement, textual content, a first picture, and a second picture similar to the control version of the web page 200A shown in FIG. 2A. However, the variant version of web page 200B includes the second advertisement positioned in the upper portion 201 of web page 200B whereas the second advertisement is positioned in the lower portion 205 in the control version of the web page 200A. In one embodiment, the variation test using the control version and the variant version of the web page is conducted to determine whether the second advertisement receives more selections when the second advertisement is located at the lower portion 205 of the web page as shown in FIG. 2A or when the second advertisement is located at the upper portion 201 of the web page as shown in FIG. 2B. While the above example is focused on a web page, the same methods described above can be used to perform content experimentation on software applications (such as mobile applications or chatbots) and other content items.

Referring back to FIG. 1A, the edge node 150 may serve as a remote computing device that may communicate with CDN 130 via network 140C. Edge node 150 may be implemented on a server. In some embodiments, edge node 150 may be implemented as a virtual machine (VM) or run as a container. Edge node 150 may include hardware such as processing device 152 and memory 151, which may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The memory may be configured for long-term storage of data and may retain data between power on/off cycles of the edge node 150.

Memory 151 may have stored thereon snippet generation logic 151A and web data file 151B. In some embodiments, the web data file 151B may be cached at the CDN 130. The snippet generation logic 150A may contain instructions that, when executed by processing device 152, cause the edge node 150 to perform the functions described herein with respect to FIG. 1A. In one embodiment, the web data file 151B may store one or multiple (i.e., a plurality of) experiment records that each describe a content experiment and/or variations of content items (also referred to as content variations), as configured by the variation testing system. Each experiment record may be associated with a web page(s) (e.g., whether a static web page or a view of a dynamic web page), and may include an experiment identifier (ID) unique to the content experiment as well as identifiers of different content variations (e.g., having different features) of a web page involved in the content experiment. An experiment record may also include a description of the change(s) made to the content experiment or content variation of the web page compared to the control variation of the web page (or, in the case of personalization, a default variation). An experiment record may also include a set of URL targeting criteria, audience targeting rules and membership threshold criteria (collectively referred to as targeting criteria) used to define an audience for that content experiment (e.g., a pool of eligible visitors for that experiment)

Although the embodiments described herein relate to content experiments, in some embodiments, each experiment record may also or alternatively include personalized content campaigns including content variations such as custom greetings, web site display preferences, new features, and other content items. In such embodiments, the targeting criteria may be used to determine whether a personalization content campaign is to be integrated into a particular visitor's experience. As noted above, for ease of reference the term content experiment may include personalize content campaigns.

An experiment record may include user-defined URL targeting criteria that indicates where (e.g., which pages of a web site) and when to deliver the associated content experiments, personalized experiences, or recommendations on the user's web site. The URL targeting criteria may be tied to specific URLs, multiple URLs or patterns of URLs on a web site, or they may be applied globally across an entire web site as discussed further herein. In some embodiments, if content provider 120 is operating in the context of a mobile application or a chat application and not hosting a web site) for example, the URL targeting rules may instead be based on headers, IP addresses, cookies, code flags, and/or URIs (uniform resource identifiers) that determine where to deliver the associated content experiments, personalized experiences, or recommendations on the content providers mobile application or chat application.

An experiment record may also include audience targeting rules, which describe criteria that visitors must meet to be part of the audience to that experiment. Only visitors that fall within the target audience may be eligible for that experiment. For example, a user may want an experiment to target visitors who've seen a specific AdWords campaign. In another example, a user may wish to show an experiment to visitors on mobile devices only. The user may then define audience targeting rules to provide the experiment (or particular content item variations) to that particular group of visitors. Audiences may be defined based on a number of factors, including the type of browsers and/or type of devices being used by a visitor to access the website, a source the visitor arrived from (e.g., an AdWords campaign, a Google search, or a Facebook ad), visitors who have certain cookies, visitors who come to a user's page with certain query parameters (e.g., a parameter indicating that the visitor is a member of that website or is a VIP member of that website), a visitor ID and visitors with browsers set to certain geographical areas and/or languages among others. Thus, each content experiment may have audience targeting rules associated with it in the web data file 151B that indicate which visitors are eligible for that experiment.

An experiment record may also include user defined membership threshold criteria for the experiment. Membership threshold criteria may be the percentage of eligible traffic (visitors) that is allowed to see an experiment. For example, if a user allocates 75% of their visitors who meet the audience targeting rules to an experiment, 25% of eligible visitors may not see the experiment at all. In some embodiments, the variation testing system may augment an experiment record with information from external data sources to further define audience targeting rules, URL targeting criteria, or membership threshold criteria. For example, the variation testing system may retrieve information from other content providers, external databases, or other appropriate sources and store that information on the experiment record at the edge node 150.

Content provider 120 may operate in any of a variety of contexts such as web site hosting, providing mobile applications, or providing server-side applications. Thus, the user may select a subset of the URL targeting criteria, audience targeting rules, and membership threshold criteria themselves based on the context that content provider 120 operates in. Stated differently, content provider 120 may provide a website, mobile application, chat application, one or more APIs, a smart device interface, or any other appropriate application with a network connection. Thus, the user may selectively apply URL targeting criteria, audience targeting rules, and membership threshold criteria that are appropriate for the application that content provider 120 is hosting. For example, it the content provider 120 is providing a chat application, the user may determine that URL targeting may not be implemented or may be implemented differently, as requests to a chat application may not include URLs. In this example, the URL targeting criteria may include a URI indicating locations of content experiments and the audience targeting rules for determining whether a visitor is eligible for an experiment may include a visitor ID, a query parameter (what is the topic of conversation or help/support needed?), a type of device the visitor is accessing from, a source the visitor is accessing from, a location of the visitor, and/or a language of the visitor. In another example, if the content provider 120 is providing a mobile music streaming application, the user may determine that URL targeting may not be implemented or may be implemented differently as requests to a music streaming application may not include URLs. In this example, the URL targeting criteria may include an IP address indicating the location of requested content and the audience targeting rules for determining whether a visitor is eligible for an experiment may include a visitor ID, a query parameter (e.g., what music do they want to hear?), a location of the visitor and a language of the visitor. Therefore, the user may determine the subset of URL targeting criteria, audience targeting rules, and membership threshold criteria that will be used to define an audience for each content experiment (reflected in the web data file 150B) based on the type of content the content provider 120 provides (i.e. the context in which content provider 120 operates).

Each experiment record may also include user-defined traffic, allocation criteria to define how visitors will be assigned to different variations of a content experiment. In addition to assigning a percentage of eligible visitors to an experiment, a user may define how that percentage will be split between the variations of that experiment. For example, a user may define an experiment having 2 variations (A and B), and assign the experiment a 40% traffic allocation with 50/50 distribution among the variations. Edge node 150 may assign a range of values (buckets) to the experiment (e.g., 0-10000) to be allocated to visitors. If a visitor falls within buckets 0-1999, they may be assigned to variation A. Thus, if a visitor falls within buckets 2000-3999, they may see variation B. If they are in buckets 4000-10000 they will not be eligible for the experiment at all as they are now outside of the 40% traffic allocation set for the experiment.

In some embodiments, the information in an experiment record may be captured in web data file 151B which may represent the variation testing records in a format that is easily consumable by code. For example, web data file 151B may be a JavaScript Object Notation (JSON) file that includes the experiment records associated with each content experiment. In other embodiments, information in the experiment record may be generated and processed dynamically.

Although described in terms of a web browser requesting content from a web site, the embodiments described herein may be implemented in any appropriate context. For example, client device 110 may be a mobile device accessing content from a mobile application hosted by content provider 120. In another example, client device 110 may be a set top box requesting content from a video streaming service provided by content provider 120.

In some embodiments, CDN 130 may receive a request for a web page from client device 110. CDN 130 may be any CDN that supports ESI expressions, or any other appropriate method of including remote content, such as server side includes (SSI) expressions for example. CDN 130 may retrieve the web page indicated by the request from content provider 120. The HTML code corresponding to the retrieved web page may include an ESI expression embedded therein. Upon retrieval of the web page, CDN 130 may evaluate the ESI expression to determine an instruction for communicating with edge node 150. The ESI expression may instruct the CDN 130 to forward information in the request to the edge node 150 for further processing. If content provider 120 is running in the context of a hosting a web site, such information may include the type of browser and/or type of device being used by the visitor to access the website, a source the visitor arrived from (e.g., an AdWords campaign, a Google search, or a Facebook ad), certain cookies stored on the visitor's browser, certain query parameters in the request (e.g., a parameter indicating that the visitor is a member of that website or is a VIP member of that website), a visitor ID and a geographical area and/or language that the visitor's browser are set to among others. In another example, if content provider 120 is running in the context of a mobile application, such information may include a uniform resource identifier (URI), the page on the application being used, a feature flag (identifying a particular feature), a visitor ID, and a geographic location. In another example, if content provider 120 is running in the context of a television or video streaming service, such information may include a set top box ID number, a television model number, information on shows being viewed, a visitor ID and a geographic location.

In some embodiments, where the computing device requesting content does not already have a visitor ID associated with it, edge node 150 may also generate a visitor ID for the computing device upon receiving the content request. The visitor ID may also be generated by the variation testing system, the content provider 120 or another appropriate system. The visitor ID may be a randomly generated integer, an email address or login ID corresponding to the visitor, an ID corresponding to the device (e.g. a set top box ID number), or another value used to identify the requesting computing device and/or visitor. In the context of web site experimentation, for example, the visitor ID may be stored on a cookie the visitor's browser (using the snippet as described below). In the content of mobile apps, for example, the visitor ID may be stored in the mobile app. Subsequently, when the visitor sends subsequent requests for the same content (web page), those requests will include the visitor ID and the edge node 150 may automatically retrieve the experiment variants associated with the visitor ID.

Upon receiving the request from CDN 130, edge node 150 may execute snippet generation logic 150A to generate a snippet indicating and enabling execution of content experiments and/or content experiment variations that are to be delivered to the destination computing device. In some embodiments, the snippet may contain code that enables execution of the content experiment variations on the destination computing device. In other embodiments, the snippet may include configurations for an experiment (e.g. portions of the web data file 151B that are applicable to the content experiment variations), data, and additional code (e.g. code to generate a visitor ID or to pull content items from a CDN, or to interface with and enable changes to a web page or mobile app). In still other embodiments, the snippet may further include the content items themselves (e.g code for a web-site feature, images, videos, and/or other content items to be delivered to the requesting computing device). The snippet may be generated in an appropriate format. For example, in the context of content item experimentation on a web page. Edge node 150 may generate a snippet containing code (e.g. Javascript) and transmit the code to the browser 110A. In generating the snippet using the snippet generation logic 150A, Edge node 150 may exclude code, data, configuration, and/or other content that are irrelevant to the destination computing device.

In generating the snippet, edge node 150 may use various methods and/or logic to determine which content experiments and/or content experiment variations are relevant to the requesting computing device. For example, edge node 150 may initially determine which experiments the visitor is eligible for based on the URL targeting criteria, audience targeting rules and membership threshold criteria. More specifically, edge node 150 may consume the web data file 151B including the experiment records for each experiment running on the content provider 120. Because edge node 150 may operate in the context of a web site hosted by content provider 120, in some embodiments, the full set of URL targeting criteria, audience targeting rules and membership threshold criteria may be used by the user to define an audience for each content experiment. However, in some embodiments, the edge node 150 may utilize a user defined subset of the set of URL targeting criteria, audience targeting rules and membership threshold criteria depending on the context in which content provider 120 is running (as discussed further herein).

In some embodiments, edge node 150 may parse the web data file 151B and examine the URL targeting criteria for each experiment in order to determine where (e.g., which web page(s)) each experiment is running. Edge node 150 may utilize the URL targeting to compare the URL indicated in the request to the URL(s) indicated by the URL targeting criteria to determine whether the request is directed to a web page having content experiments running thereon. Edge node 150 may identify a set of content experiments including each content experiment on the web page identified by the edge node 150 as having a URL that matches the URL of the request. In some embodiments, edge node 150 may use simple matching, wherein a request URL will be determined as matching a URL indicated by the URL targeting criteria even if the request URL has variations. Such variations may include changing a query parameter, changing a hash parameter, changing a protocol, or adding/removing "www" from the URL. In other embodiments, edge node 150 may use exact matching which requires an exact match between the request URL and the URL specified in the URL targeting criteria. Still other embodiments may utilize substring matching, which may require matching specific strings of text within the request URL and URLs specified in the URL targeting criteria.

In other examples, edge node 150 may identify a set of experiments associated with the requested content using information included in the request, such as headers, IP addresses, cookies, or URIs, and match this information to audience targeting rules in the experiment record. For example, edge node 150 may extract parameters from the request including the type of browser and/or type of devices being used by the visitor to access the website, or a source the visitor arrived from e.g., an AdWords campaign, a Google search, or a Facebook ad). The request may also be sent with additional information such as a visitor ID, certain cookies stored on the visitor's browser, certain query parameters (e.g., a parameter indicating that the visitor is a member of that website or is a VIP member of that website), and certain geographical areas and/or languages that the visitor's browser are set to, among others.

Edge node 150 may then determine which of the content experiments in the identified set of content experiments the visitor qualifies for by comparing the information receiving in the request to the audience targeting rules. As discussed above, audience targeting rules describe criteria that a visitor must meet to be part of the audience for that experiment (to be eligible for that experiment).

Edge node 150 may parse the web data file and examine the audience targeting rules for each of the identified content experiments. Edge node 150 may then compare the information extracted from the request to the audience targeting rules for each of the identified content experiments to determine which audience targeting rules the visitor matches or, stated differently, which content experiments' audiences the visitor is a part of. In some embodiments, edge node 150 may determine that the visitor is eligible for each content experiment whose audience the visitor is a member of. In some embodiments, the information extracted from the request must match all of an experiment's audience targeting rules in order for the visitor to be eligible for that particular experiment. In other embodiments, a visitor may be eligible for a particular experiment if information extracted from the request matches at least a user defined subset of that experiment's audience targeting rules.

In still other embodiments, the audience targeting rules are not "sticky," meaning the rule/condition is re-evaluated for the visitor on each new page load regardless of whether the experiment conditions have changed. For example, the visitor may meet the audience targeting rules and be included in the content experiment early on. If the visitor returns later with a different browser or language setting that doesn't meet the experiment's audience targeting rules, they will no longer be eligible for the experiment. In some embodiments, only certain experiment conditions (e.g., the Ad Campaign and New/Returning Session audience targeting rules) may be sticky. In some embodiments, the audience targeting rules may be sticky as long as the content experiment does not change.

In some embodiments, edge node 150 may determine which of the content experiments to provide in response to the request by a computing device by parsing the web data file, examining the membership threshold criteria for each experiment that the visitor is an audience member of, and determining if the limit on eligible users for any of the experiments has been reached. For those experiments for which the limit has been reached, edge node 150 may determine that those experiments and any associated variations will not be shown to the visitor regardless of eligibility. For those experiments for which the limit has not been reached, edge node 150 may determine that those experiments and any associated variations will be shown to eligible visitors as described in further detail herein.

Edge node 150 may also use targeting criteria to target specific content item variations to a particular audience of visitors. For example, edge node 150 may retrieve a visitor ID stored on a mobile device application, compare at to a list of VIP users of that application store on the content provider, and determine based on the targeting criteria that visitors who are a member of this audience are eligible to receive an enhanced feature. Alternatively, edge node 150 may retrieve the geographic location of the mobile device and determine based on audience targeting criteria that users located in California are eligible to receive a content item variation in the form of a discounted price for an item purchased through the app.

In other embodiments, edge node 150 may determine which variations of each experiment will be shown to the visitor by assigning the visitor to an experiment randomly, for example, using a hash based on the visitor ID and the experiment ID. As discussed above, an experiment may have 2 variations (A and B), and a 40% traffic allocation with 50/50 distribution among the variations, as well as a range of values ranging from 0-10000 assigned to it (stored in web data file 151B). For each eligible experiment, edge node 150 may hash the visitor ID (obtained from the request) and the experiment ID (stored in web data file 151B) to an integer that falls within the range of values (e.g. 0-10000) assigned to that experiment. Edge node 150 may use any deterministic hash function such as MurmurHash to hash the experiment ID with the visitor ID. If the hash of the visitor ID with the experiment ID produces an integer in the range of 0-1999, edge node 150 will assign the visitor to variation A. If the hash of the visitor ID with the experiment ID produces an integer in the range of 2000-3999, edge node 150 will assign the visitor to variation B. If the hash of the visitor ID with the experiment ID produces an integer outside the range of 0-3999, edge node 150 will determine that the visitor will not be shown experimental content. In this way, edge node 150 may randomly determine which variations of each experiment the visitor is to be assigned to. Because edge node 150 utilizes a deterministic hashing function, the hash of the experiment ID with the same visitor ID will produce the same integer that falls within the same range of values (e.g. 0-1999) and maps back to the same variation (e.g. variation A), as long as the conditions of the experiment (e.g., audience targeting rules, traffic allocation criteria etc.) do not change. Variation assignments that are consistently maintained may be referred to as "sticky" variation assignments.

The edge node 150 executing snippet generation logic 150A may thus use a variety of methods and/or logic to determine what content experiments and/or content experiment variations are to be delivered in response to a request and to generate a snippet indicating and enabling execution of the content experiments and/or content experiment variations that edge node 150 has determined the destination computing device (e.g. a client device) should receive (e.g. the content experiments and/or content variations that are to be delivered to a given visitor or client device based on the processing of targeting criteria). In doing so, edge node 150 may exclude content (e.g. code, instructions and/or data) from the snippet that is irrelevant for the destination computing device. Thus, the snippet generation logic 150A running on edge de 150 can reduce the size of the payload to be delivered to the requesting computing device and front load the decision making process. For example, in the context of content item experimentation can a web page, the snippet may include Javascript code that browser 110A would execute to perform the content item experiment. By generating a snippet using the snippet generation logic 150A, the snippet includes only the Javascript code for the content variations (e.g. the content experiments and/or content experiment variations) that the visitor or client device is meant to see, thereby reducing the size of Javascript code that CDN 130 sends to the browser 110A and also reducing the amount of Javascript code that the browser 110A must process. Stated differently, browser 110A does not have to expend as many computational resources because the amount of Javascript code contained in the snippet is smaller, as it does not include Javascript code enabling all the available content item variations, just those that the visitor or client device is meant to see.

Figure 1B:
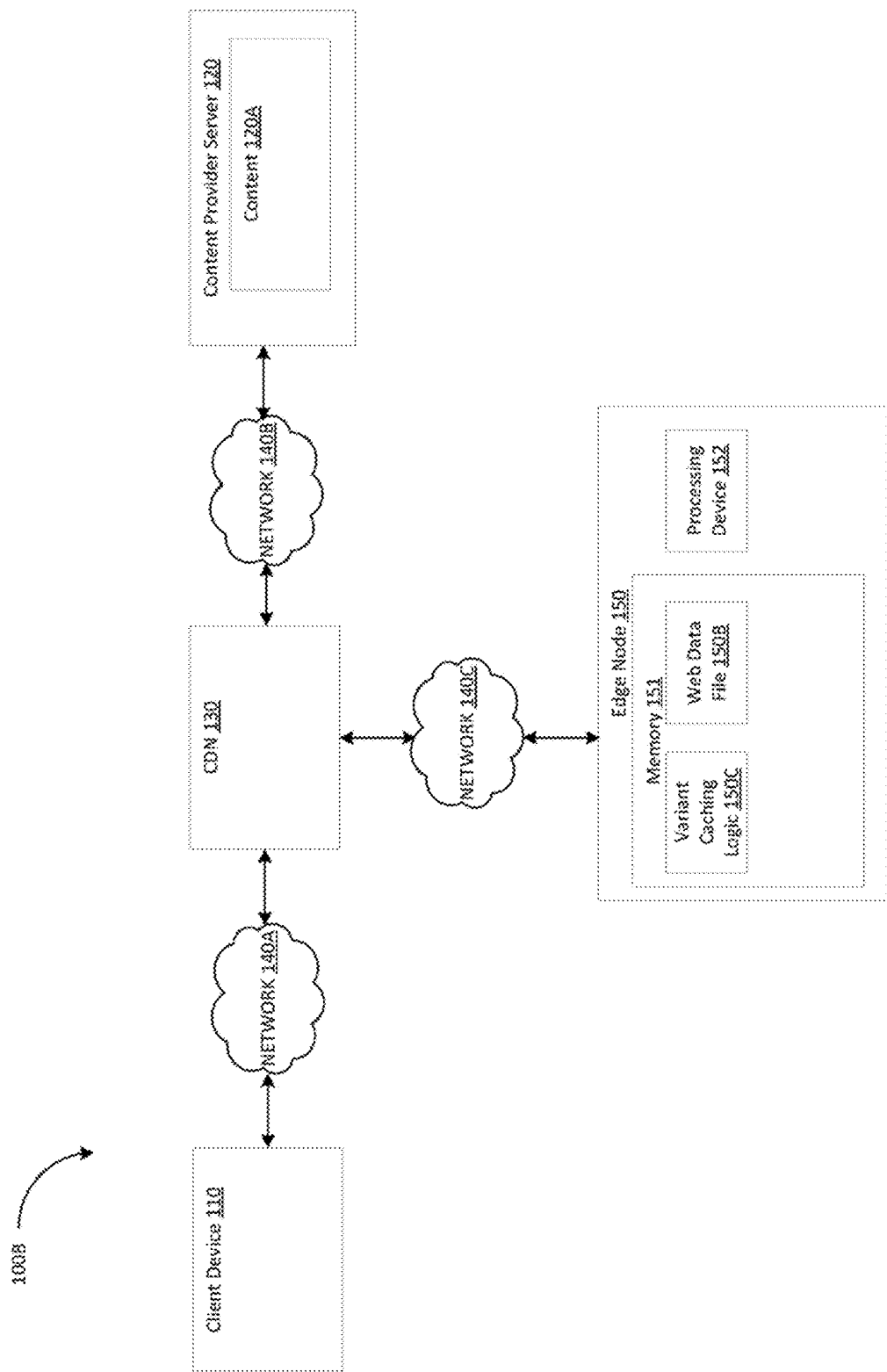
FIG. 1B is a block diagram of a variant testing system environment, in accordance with some embodiments of the present disclosure.

FIG. 1B illustrates an environment 100B according to some embodiments. The environment 100B may be similar to the environment 100A illustrated in FIG. 1A, however edge node 150 may not operate in the context of a web site host (content provider 120) communicating with a browser 110A. Client device 110 may be a mobile phone requesting content for a mobile application provided by Content Provider 120. In other embodiments, Client device 110 may be a personal computer or laptop interacting with a chat application program hosted by content provider 120. In yet other embodiments, client device 110 may be a set top box interacting with a television or streaming video application provided by content provider 120.

Edge node 150 may include hardware such as processing device 152 and memory 151, which may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The memory may be configured for long-term storage of data and may retain data between power on/off cycles of the edge node 150.

Memory 151 may have stored thereon variant caching logic 151C and web data file 151B. The variant caching logic 151C may contain instructions that, when executed by processing device 152, cause the edge node 150 to perform the functions described herein with respect to FIG. 1B. In one embodiment, the web data file 151B may store multiple (i.e., a plurality of) experiment records that each describe a content experiment (and variations thereof) conducted by the variation testing system as previously described herein. Each experiment record may be associated with content (e.g., a chat application interface, a web page, a mobile application interface etc.), and may include an experiment identifier (ID) unique to the content experiment as well as identifiers of different content experiment variations for the content experiment. An experiment record may also include a description each content experiment or variation. As discussed above, an experiment record may also include a set of targeting criteria used to define an audience for that experiment (e.g., a pool of eligible visitors for that experiment).

CDN 130 may receive a request for content stored on content provider 120 from client device 110 and may forward the request to the edge node 150 for further processing.

The request may be the first request in a session in which a series of requests will be made. Upon receiving the request, edge node 150 may cache every content experiment variation that could be assigned to client devices requesting content for the mobile application, chat application program, streaming video application, etc. The experiment variations may be cached at CDN 130, for example.

Edge node 150 may instead execute variant caching logic 10C to determine which content experiment variations for the requested content the client device 110 is meant to receive. For example, edge node 150 may determine which experiments the visitor is eligible for based on the targeting criteria (e.g. URL targeting criteria, audience targeting rules, and/or membership threshold criteria). However, because content provider 120 may operate in any of a variety of contexts such as web site hosting, providing mobile applications, or providing server-side applications, the user may select a subset of the targeting criteria are relevant based on the context that content provider 120 operates in. For example, it the content provider 120 is providing a chat application or a mobile music streaming application, the user may determine that URL targeting is not relevant, as requests to a chat application or mobile music streaming application may not include URLs. In this example, the URL targeting criteria may instead be based on a URI or flag (e.g. a reference included in the application code) indicating locations for content experiments in the chat application or mobile music streaming application. The targeting criteria may further include audience targeting rules for determining whether a visitor is eligible for an experiment may include a visitor ID, targeting criteria based on a query parameter (e.g., what is the topic of conversation or help/support needed?), targeting criteria based on a type of device the visitor is accessing from, targeting criteria based on a location of the visitor, and/or targeting criteria based on the language of chat application or mobile music streaming application. Therefore, the user may determine the subset of targeting criteria that will be used to define an audience for each content experiment (reflected in the web data file 151B) based, at least in part, on the type of content the content provider 120 provides (i.e. the context in which content provider 120 operates). The user may also determine the targeting criteria based on the goals for the content experiments. For example, where the user wishes to provide specific content items to an audience in California, he/she may select targeting criteria, such as geolocation, to enable the content experiment.

Furthermore, although described in terms of a web browser requesting content from a web site, the embodiments described herein may be implemented in any appropriate context. For example, client device 110 may be a mobile device accessing content from a mobile application hosted by content provider 120. In another example, client device 110 may be a set top box requesting content from a video streaming service provided by content provider 120.

Upon receiving information from the request, edge node 150 (executing variant caching logic 151C) may consume the web data file 151B representing the content experiment records and associated targeting criteria, such as URL targeting criteria, audience targeting rules, and membership threshold criteria. Edge node 150 may parse the web data file 151B and examine the targeting criteria for each content experiment.

For example, edge node 150 may utilize URL targeting to compare the URL(s) indicated in the request to the URLs) indicated by the URL targeting criteria for each content experiment to determine whether the request is directed to content having experiments. Edge node 150 may identify a set of experiments including each experiment on each web page that the edge node 150 identities as having a matching URL to the URL of the request. In some embodiments, edge node 150 may use simple matching, wherein a request URL will be determined as matching a URL indicated in the URL targeting criteria even if the request URL has variations. Such variations may include changing a query parameter, changing a hash parameter, changing a protocol, or adding/removing "www" from the URL. In other embodiments, edge node 150 may use exact matching which requires an exact match between the request URL and the URL specified in the URL targeting criteria. Still other embodiments may utilize substring matching, which may require matching specific strings of text within a URL. In some embodiments, if content provider 120 is operating in the context of a mobile application or a chat application (and not hosting a web site) for example, the URL targeting rules may instead be based on headers, IP addresses, cookies, flags, or URIs that determine where to deliver the associated content experiments, personalized experiences, or recommendations on the content providers mobile application or chat application.

Edge node 150 may also utilize audience targeting to determine which of the experiments in the identified set of experiments the visitor qualifies for. Edge node 150 may parse the web data file 151B and examine the audience targeting rules for each identified experiment. As discussed above, audience targeting rules describe criteria that visitors must meet to be part of the audience for that experiment and the audience targeting rules may include only a subset of the rules discussed above with respect to FIG. 1A (i.e. less rules than utilized in the browser context) because in the embodiment described here with respect to FIG. 1B, content provider 120 may operate in various contexts. Edge node 150 may determine which experiments' audiences the visitor is a member of based on information received in the request. For example, edge node 150 may obtain the information from the request including a visitor ID, a query parameter (e.g., what music do they want to hear?), a location of the visitor and a language of the visitor among others. Edge node 150 may compare the information obtained from the request to the audience targeting rules for each identified experiment to determine which audience targeting rules the visitor matches or, stated differently, which experiments' audiences the visitor is a part of. In some embodiments, edge node 150 may determine that the visitor is eligible for each experiment whose audience the visitor is a member of. In some embodiments, the information extracted from the request must match all of an experiment's audience targeting rules in order for the visitor to be a member of the audience for that particular experiment. In other embodiments, a visitor may be a member of the audience for a particular experiment if the information extracted from the request matches a subset of that experiment's audience targeting rules. If there are no membership threshold criteria, then the visitor is eligible for each experiment that they are a member of the audience for.

In some embodiments, edge node 150 may parse the web data file 151B and examine the membership threshold criteria for each content experiment that the visitor is an audience member of to determine if membership threshold criteria has been defined for those content experiments. Edge node 150 may parse the web data file 151B and examine the membership threshold criteria (if any) for each experiment that the visitor is an audience member of to determine if the limit on eligible users for any of the experiments has been reached. For those experiments for which the limit has been reached, edge node 150 may determine that those experiments and any associated variations will not be shown to the visitor regardless of eligibility. For those experiments for which the limit has not been reached, edge node 150 may determine that those experiments and any associated variations will be shown to eligible visitors as described in further detail herein.

Edge node 150 also may determine which variations of each eligible experiment will be shown to the visitor by assigning the visitor to an experiment randomly, for example, using a hash based on the visitor ID and the experiment ID. As discussed above, an experiment may have 2 variations (A and B), and a %40 traffic allocation with 50/50 distribution among the variations, as well as a range of values ranging from 0-10000 assigned to it (stored in web data file 151B). For each eligible experiment, edge node 150 may hash the visitor ID (obtained from the request) and the experiment ID (stored in web data file 151B) to an integer that falls within the range of values (e.g. 0-10000) assigned to that experiment. Edge node 150 may use any deterministic hash function such as Murmurhash to hash the experiment ID with the visitor ID. If the hash of the visitor ID with the experiment ID produces an integer in the range of 0-1999, edge node 150 will assign the visitor to variation A. If the hash of the visitor ID with the experiment ID produces an integer in the range of 2000-3999, edge node 150 will assign the visitor to variation B. If the hash of the visitor ID with the experiment ID produces an integer outside the range of 0-3999, edge node will may determine that the visitor is not eligible for the experiment. In this way, edge node 150 may randomly determine which variations of each experiment the visitor is to be assigned to. Because edge node 150 utilizes a deterministic hashing function, the hash of the experiment ID with the same visitor ID will produce the same integer that falls within the same range of values (e.g. 0-1999) and maps back to the same variation (e.g., variation A), as long as the conditions of the experiment (e.g., audience targeting rules, traffic allocation criteria etc.) do not change. Variation assignments that are consistently maintained may be referred to as "sticky" variation assignments.

Upon determining the content experiments and/or content experiment variations that are assigned to the visitor, edge node 150 may track the content experiment variations that it assigns to the visitor. For example, Edge node 150 may keep a record of the names of the content experiments and/or content experiment variations assigned to the visitor. Alternatively, edge node 150 may track the unique ID(s) of the content experiments and/or content experiment variations assigned to a visitor, or hash value(s) for each experiment and/or content experiment variations based on the content of these experiment and variations. Edge node 150 may then apply a hashing algorithm to these records (e.g. to the list of names of the experiments and/or content experiment variations assigned to a visitor, to the unique IDs for these experiments and/or content experiment variations, or to the hash values for these items). When applying the hashing algorithm, Edge node 150 may also include other values, such as the visitor ID for the visitor. Thus, edge node 150 generates a hash representing the determined content experiments and/or content item variations to be delivered to the Client Device in response to the request. Edge note 150 may alternatively apply the hashing algorithm, for example, to the content items themselves or, to their filenames, to the set of URLs or URIs that identify the content items, or to the snippet containing the instruction, code or configurations identifying which of the content item variations to be delivered to the destination computing device.

Edge node 150 may apply any appropriate hashing algorithm such as SHA-256. Edge node 150 may store the hash (also referred to as "hash value") as a caching cookie, and transmit the caching cookie to the CON 130 as well as to the user device 110. At this point, the determined variations may not be cached on the CDN 130 and thus the CDN 130 may in turn pass the caching cookie to the content provider 120. The content provider 120 may "unpack" the hash to determine which variations are indicated by the hash. Because the content provider 120 and edge node 150 may share the same hashing function or the same hashing key, the hashing function may be easily reversible. The content provider 120 may return all of the variations indicated in the cookie to the CDN 130, resulting in CDN 130 having a mapping of the cookie value to the variations assigned to the visitor as well as caching the variations returned by the content provider 120. When the visitor makes subsequent requests, the client device may pass the caching cookie value to the CDN 130 which has already cached the variants associated with the visitor. Thus, the particular content items for the client device may be retrieved from the CDN 130. Because the CDN 130 may cache only the variations to which the visitor or visitor group could be assigned, this in turn may reduce the amount of content to be cached for a set of content experiments since variations irrelevant to the visitor are not cached). As a result, the percentage of requests served by the CDN 130 may be maximized even though the number of experiments and experiment variations being performed on the content provider 120 (and thus the amount of content to cache) is simultaneously increasing as well.

In some embodiments, the user device 110 may store the caching cookie on the visitor's browser. Subsequently, when the visitor sends subsequent requests for the same content, those requests will include the caching cookie and the edge node 150 may automatically retrieve the experiment variants associated with the caching cookie. In some embodiments, the audience targeting rules are not "sticky," meaning the rule/condition is re-evaluated for the visitor on each new page load regardless of whether the experiment conditions have changed. For example, the visitor may meet the audience targeting rules and be included in the experiment early on. If the visitor returns later with a different browser or language setting that doesn't meet the experiment's audience targeting rules, they will no longer be eligible for the experiment. In some embodiments, only certain experiment conditions (e.g., the Ad Campaign and New/Returning Session audience targeting rules) may be sticky. In some embodiments, the audience targeting rules may be sticky as long as the variation experiment does not change.

Figure 3A:
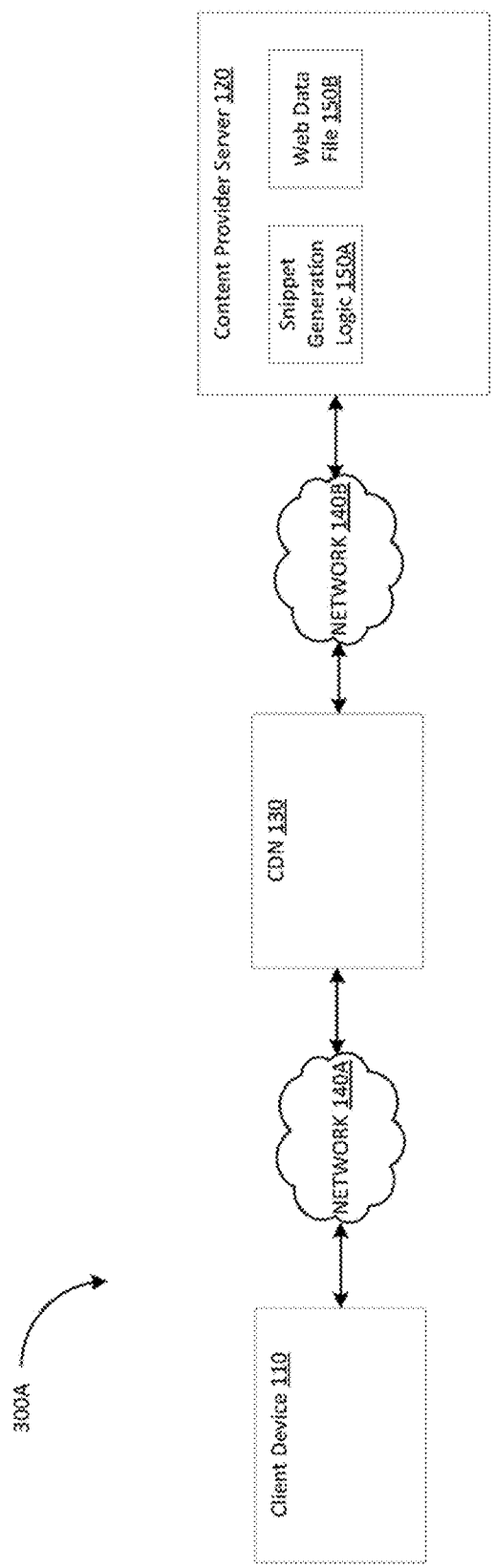
FIG. 3A is a block diagram of a variant testing system environment, in accordance with some embodiments of the present disclosure.

FIG. 3A is a block diagram of a system environment 300A according to one embodiment. System environment 300A may include client device 110, CDN 130, and content provider server 120 (hereinafter referred to as content provider 120). Client device 110, CDN 130, and content provider 120 may function and communicate with each other via network 140 as described above with respect to FIG. 1A. However, in the embodiment described in FIG. 3A, the functions of edge node 150 described in FIG. 1A may be implemented in content provider 120.

In some embodiments, CDN 130 may receive a request for a web page from a visitor (via the browser 110A on client device 110). The CDN 130 may forward the request to the content provider 120 for further processing.

Upon receiving the request from the CDN 130, content provider 120 may execute snippet generation logic 151A to generate a snippet indicating and enabling execution of the content experiments and/or content experiment variations that content provider 120 has determined the destination computing device (e.g. a client device) should receive (e.g. the content experiments and/or content variations that are to be delivered to a given visitor or client device based on the processing of targeting criteria) as discussed above with respect to FIG. 1A. In doing so, content provider 120 may exclude content (e.g. code, instructions and/or data) from the snippet that is irrelevant for the destination computing device.

Thus, the snippet generation logic 150A running on content provider 120 can reduce the size of the payload to be delivered to the requesting computing device and front load the decision making process. For example, in the context of content item experimentation on a web page, the snippet may include Javascript code that browser 110A would execute to perform the content item experiment. By generating a snippet using the snippet generation logic 150A, the snippet includes only the Javascript code for the content variations (e.g. the content experiments and/or content experiment variations) that the visitor or client device is meant to see, thereby reducing the size of Javascript code that CDN 130 sends to the browser 110A and also reducing the amount of Javascript code that the browser 110A must process. Stated differently, browser 110A does not have to expend as many computational resources because the amount of Javascript code contained in the snippet is smaller, as it does not include Javascript code enabling all the available content item variations, just those that the visitor or client device is meant to see.

Figure 3B:
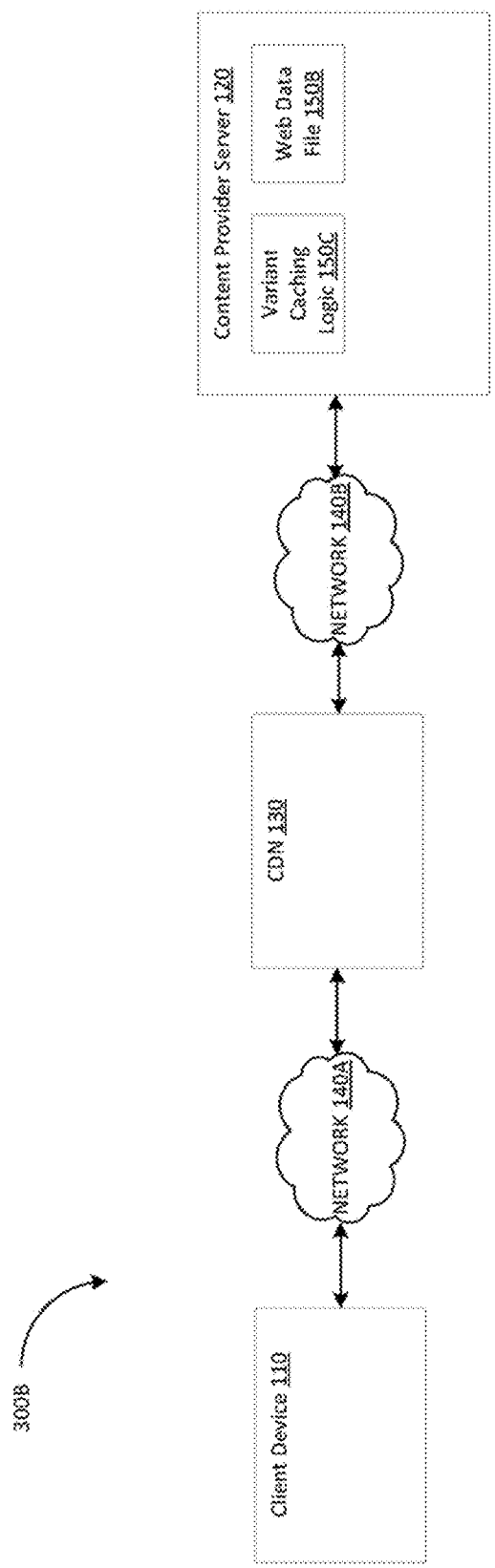
FIG. 3B is a block diagram of a variant testing system environment, in accordance with some embodiments of the present disclosure.

FIG. 3B is a block diagram of a system environment 300B according to some embodiments. System environment 300B may include client device 110, CDN 130, and content provider server 120 (hereinafter content provider 120). Client device 110, CDN 130, and content provider 120 may function and communicate with each other via network 140 as described above with respect to FIG. 1B. However, in the embodiment described in FIG. 3B, the functions of edge node 150 described in FIG. 1B may be implemented in content provider 120.

In some embodiments, CDN 130 may receive a request for content stored on content provider 120 from client device 110 and may forward the request to the content provider 120 for further processing. In some embodiments, the request may be the first request in a session in which a series of requests will be made.

Upon receiving the request from CDN 130, content provider 120 may execute variant caching logic 150C to determine which variants of experiments running on the requested content the client device 110 is meant to receive and cache those variants. Content provider 120 may utilize targeting criteria to determine which content experiments the visitor is eligible for as discussed above with respect to FIG. 1B. Content provider 120 may also determine which variations of content experiments the visitor is assigned to in a similar manner as described above with respect to FIG. 1B.

Upon determining the content experiments and/or content experiment variations that are assigned to the visitor, content provider 120 may track the content experiment variations that it assigns to the visitor. For example, content provider 120 may keep a record of the names of the content experiments and/or content experiment variations assigned to the visitor. Alternatively, content provider 120 may track the unique ID(s) of the content experiments and/or content experiment variations assigned to a visitor, or hash value(s) for each experiment and/or content experiment variations based on the content of these experiment and variations. Content provider 120 may then apply a hashing algorithm to these records (e.g. to the list of names of the experiments and/or content experiment variations assigned to a visitor, to the unique IDs for these experiments and/or content experiment variations, or to the hash values for these items). When applying the hashing algorithm, content provider 120 may also include other values, such as the visitor ID for the visitor. Thus, content provider 120 generates a hash representing the determined content experiments and/or content item variations to be delivered to the Client Device in response to the request. Content provider 120 may alternatively apply the hashing algorithm, for example, to the content items themselves or, to their filenames, to the set of URLs or URIs that identify the content items, or to the snippet containing the instruction, code or configurations identifying which of the content item variations to be delivered to the destination computing device.

Content provider 120 may apply any appropriate hashing algorithm such as SHA-256. Content provider 120 may store the hash (also referred to as "hash value") as a caching cookie, and transmit the caching cookie to the CDN 130 as well as to the user device 110. At this point, the determined variations may not be cached on the CDN 130 and thus the content provider 120 may return all of the variations indicated in the cookie to the CDN 130, resulting in CDN 130 having a mapping of the cookie value to the variations assigned to the visitor as well as caching the variations returned by the content provider 120. When the visitor makes subsequent requests, the client device may pass the caching cookie value to the CDN 130 which has already cached the variants associated with the visitor. Thus, the particular content items for the client device may be retrieved from the CDN 130. Because the CDN 130 may cache only the variations to which the visitor or visitor group could be assigned, this in turn may reduce the amount of content to be cached for a set of content experiments (since variations irrelevant to the visitor are not cached). As a result, the percentage of requests served by the CDN 130 may be maximized even though the number of experiments and experiment variations being performed on the content provider 120 (and thus the amount of content to cache) is simultaneously increasing as well.

In some embodiments, the user device 110 may store the caching cookie on the visitor's browser. Subsequently, when the visitor sends subsequent requests for the same content, those requests will include the caching cookie and the edge node 150 may automatically retrieve the experiment variants associated with the caching cookie.

Figure 4:
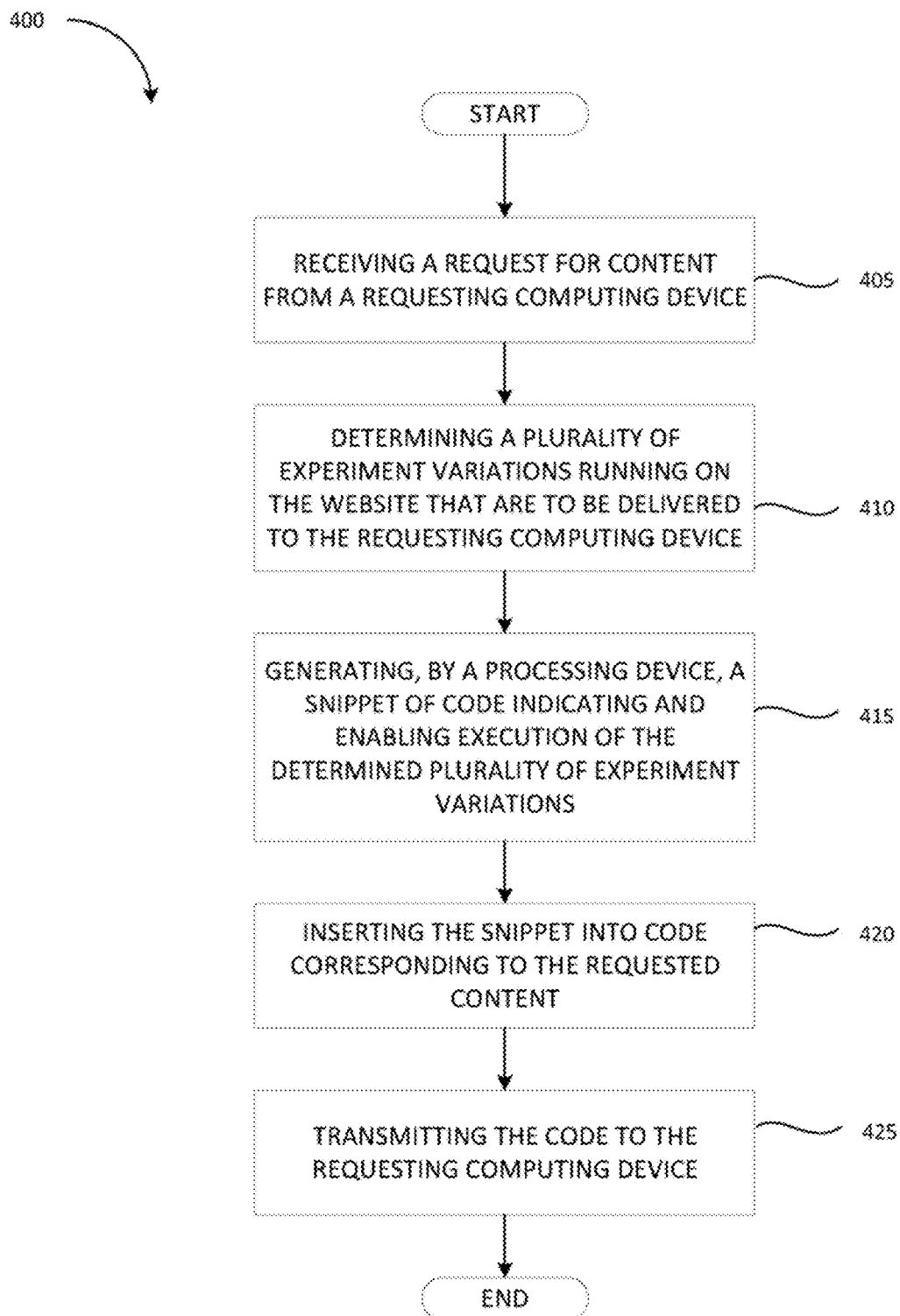
FIG. 4 is a flow diagram of a method for reducing the impact of experimental content delivery on a browser, in accordance with some embodiments of the present disclosure.

FIG. 4 illustrates a method 400 in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions naming/executing on a processing device), firmware (e.g., microcode), or a combination thereof. In some embodiments, the method 400 may be performed by a computing device (e.g., edge node 150 illustrated in FIG. 1A or content provider 120 illustrated in FIG. 3A).

Method 400 may start at block 405, where the processing logic may receive a request for content from a requesting computing device, such as a client device. In some embodiments, the request may be received from CDN 130, which has routed the request to the processing logic to determine a plurality of content experiment variations that should be sent to the requesting computing device.

At block 410, the processing logic may determine a plurality of content experiment variations that are to be delivered to the requesting computing device. The processing logic may use various methods and/or logic to determine which content experiments and/or content experiment variations are relevant to the requesting computing device. For example, the processing logic may initially determine which experiments the visitor is eligible for based on the URL targeting criteria, audience targeting rules and membership threshold criteria. More specifically, the processing logic may consume the web data file 151B including the experiment records for each experiment running on the content provider 120. Because the processing logic may operate in the context of a web site hosted by content provider 120, in some embodiments, the full set of URL targeting criteria, audience targeting rules and membership threshold criteria may be used by the user to define an audience for each content experiment. However, in some embodiments, the processing logic may utilize a user defined subset of the set of URL targeting criteria, audience targeting rules and membership threshold criteria depending on the context in which content provider 120 is running (as discussed further herein).

In some embodiments, the processing logic may parse the web data file 151B and examine the URL targeting criteria for each experiment in order to determine where (e.g., which web page(s)) each experiment is running. The processing logic may utilize the URL targeting to compare the URL indicated in the request to the URL(s) indicated by the URL targeting criteria to determine whether the request is directed to a web page having content experiments running thereon. The processing logic may identify a set of content experiments including each content experiment on the web page identified by the processing logic as having a URL that matches the URL of the request. In some embodiments, edge node 150 may use simple matching, wherein a request URL will be determined as matching a URL indicated by the URL targeting criteria even if the request URL has variations. Such variations may include changing a query parameter, changing a hash parameter, changing a protocol, or adding/removing "www" from the URL. In other embodiments, the processing logic may use exact matching which requires an exact match between the request URL and the URL specified in the URL targeting criteria. Still other embodiments may utilize substring matching, which may require matching specific strings of text within the request URL and URLs specified in the URL targeting criteria.

In other examples, the processing logic may identify a set of experiments associated with the requested content using information included in the request, such as headers, IP addresses, cookies, or URIs, and match this information to audience targeting rules in the experiment record. For example, the processing logic may extract parameters from the request including the type of browser and/or type of devices being used by the visitor to access the website, or a source the visitor arrived from (e.g., an AdWords campaign, a Google search, or a Facebook ad). The request may also be sent with additional information such as a visitor ID, certain cookies stored on the visitor's browser, certain query parameters (e.g., a parameter indicating that the visitor is a member of that website or is a VIP member of that website), and certain geographical areas and/or languages that the visitor's browser are set to, among others.

The processing logic may then determine which of the content experiments in the identified set of content experiments the visitor qualifies for by comparing the information receiving in the request to the audience targeting rules. As discussed above, audience targeting rules describe criteria that a visitor must meet to be part of the audience for that experiment (to be eligible for that experiment).

The processing logic may parse the web data file and examine the audience targeting rules for each of the identified content experiments. The processing logic may then compare the information extracted from the request to the audience targeting rules for each of the identified content experiments to determine which audience targeting rules the visitor matches or, stated differently, which content experiments' audiences the visitor is a part of. In some embodiments, the processing logic may determine that the visitor is eligible for each content experiment whose audience the visitor is a member of. In some embodiments, the information extracted from the request must match all of an experiment's audience targeting rules in order for the visitor to be eligible for that particular experiment. In other embodiments, a visitor may be eligible for a particular experiment if information extracted from the request matches at least a user defined subset of that experiment's audience targeting rules.

In still other embodiments, the audience targeting rules are not "sticky," meaning the rule/condition is re-evaluated for the visitor on each new page load regardless of whether the experiment conditions have changed. For example, the visitor may meet the audience targeting rules and be included in the content experiment early on. If the visitor returns later with a different browser or language setting that doesn't meet the experiment's audience targeting rules, they will no longer be eligible for the experiment. In some embodiments, only certain experiment conditions (e.g., the Ad Campaign and New/Returning Session audience targeting rules) may be sticky. In some embodiments, the audience targeting rules may be sticky as long as the content experiment does not change.

In some embodiments, the processing logic may determine which of the content experiments to provide in response to the request by a computing device by parsing the web data file, examining the membership threshold criteria for each experiment that the visitor is an audience member of, and determining if the limit on eligible users for any of the experiments has been reached. For those experiments for which the limit has been reached, the processing logic may determine that those experiments and any associated variations will not be shown to the visitor regardless of eligibility. For those experiments for which the limit has not been reached, the processing logic may determine that those experiments and any associated variations will be shown to eligible visitors as described in further detail herein.

The processing logic may also use targeting criteria to target specific content item variations to a particular audience of visitors. For example, the processing logic may retrieve a visitor ID stored on a mobile device application, compare it to a list of VIP users of that application store on the content provider, and determine based on the targeting criteria that visitors who are a member of this audience are eligible to receive an enhanced feature. Alternatively, the processing logic may retrieve the geographic location of the mobile device and determine based on audience targeting criteria that users located ire California are eligible to receive a content item variation in the form of a discounted price for an item purchased through the app.

In other embodiments, the processing logic may determine which variations of each experiment will be shown to the visitor by assigning the visitor to an experiment randomly, for example, using a hash based on the visitor ID and the experiment ID. As discussed above, an experiment mays have 2 variations (A and B), and a 40% traffic allocation with 50/50 distribution among the variations, as well as a range of values ranging from 0-10000 assigned to it (stored in web data file 151B). For each eligible experiment, edge node 150 may hash the visitor ID (obtained from the request) and the experiment ID (stored in web data file 151B) to an integer that fills within the range of values (e.g. 0-10000) assigned to that experiment. Edge node 150 may use any deterministic hash function such as Murmurhash to hash the experiment ID with the visitor ID. If the hash of the visitor ID with the experiment ID produces an integer in the range of 0-1999, edge node 150 will assign the visitor to variation A. If the hash of the visitor ID with the experiment ID produces an integer in the range of 2000-3999, edge node 150 will assign the visitor to variation B. If the hash of the visitor ID with the experiment ID produces an integer outside the range of 0-3999, edge node 150 will determine that the visitor will not be shown experimental content. In this way, edge node 150 may randomly determine which variations of each experiment the visitor is to be assigned to. Because edge node 150 utilizes a deterministic hashing function, the hash of the experiment ID with the same visitor ID will produce the same integer that falls within the same range of values (e.g. 0-1999) and maps back to the same variation (e.g. variation A), as long as the conditions of the experiment (e.g., audience targeting rules, traffic allocation criteria etc.) do not change. Variation assignments that are consistently maintained may be referred to as "sticky" variation assignments.

At block 415, the processing logic may generate a snippet indicating and enabling execution of the content experiments and/or content experiment variations that the processing logic has determined the destination computing device (e.g. a client device) should receive (e.g. the content experiments and/or content variations that are to be delivered to a given visitor or client device based on the processing of targeting criteria). In doing so, the processing logic may exclude content (e.g. code, instructions and/or data) from the snippet that is irrelevant for the destination computing device. At block 420, the processing logic may insert the snippet into code (e.g., HTML code) corresponding to the requested content and at block 425 the processing logic may transmit the code corresponding to the requested content to the requesting computing device. Thus, the processing logic can reduce the size of the payload to be delivered to the requesting computing device and front load the decision making process. For example, in the context of content item experimentation on a web page, the snippet may include Javascript code that browser 110A would execute to perform the content item experiment. By generating a snippet in this way, the snippet includes only the Javascript code for the content variations (e.g. the content experiments and/or content experiment variations) that the visitor or client device is meant to see, thereby reducing the size of Javascript code that CDN 130 sends to the browser 110A and also reducing the amount of Javascript code that the browser 110A must process. Stated differently, browser 110A does not have to expend as many computational resources because the amount of Javascript code contained in the snippet is smaller, as it does not include Javascript code enabling all the available content item variations, just those that the visitor or client device is meant to see.

In the embodiments discussed above, the processing operations may be accomplished by edge node 150. However, the processing steps may be performed by any computing device, such as a server or virtual machine. The computing device may be located at CDN, at the content provider, or in other parts of the networked system.

Figure 5:
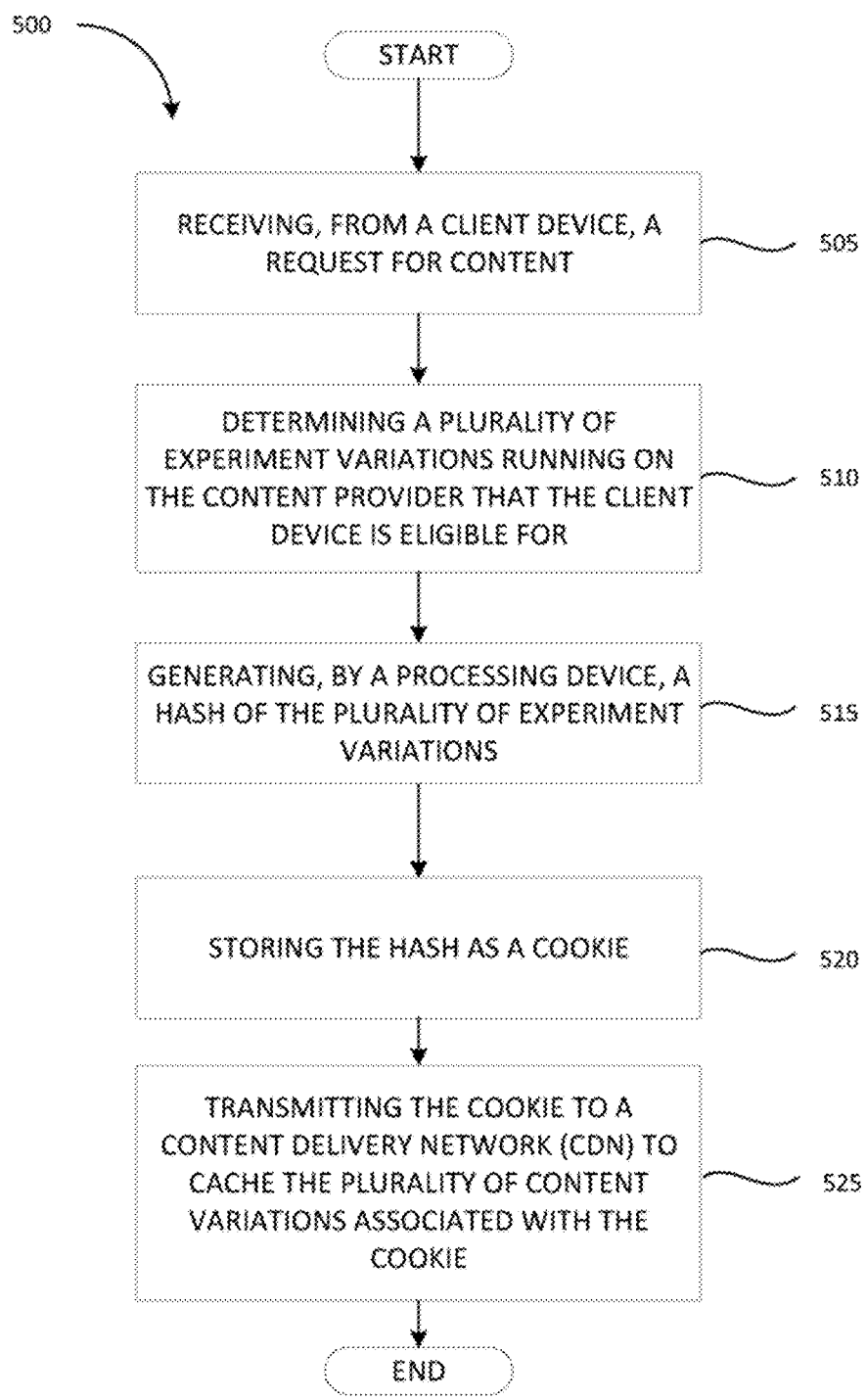
FIG. 5 is a flow diagram of a method for dynamically caching experimental content, in accordance with some embodiments of the present disclosure.

FIG. 5. Illustrates a method 500 in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., edge node 150 illustrated in FIG. 1B or content provider 120 illustrated in FIG. 3B).

At block 505, the processing logic may receive a request for content from a client device. The request may be the first request in a session including multiple requests. At block 510, the processing logic may initially determine which experiments the visitor is eligible for based on targeting criteria such as URL targeting criteria, audience targeting rules, and membership threshold criteria. However, content provider 120 may operate in any of a variety of contexts such as web site hosting, providing mobile applications, or providing server-side applications. Thus, the user may select a subset of the targeting criteria (URL targeting, audience targeting rules, and membership threshold criteria) themselves based in part on the context that content provider 120 operates in. Stated differently, content provider 120 may provide a website, mobile app, chat application, one or more APIs, a smart device interface, or any other appropriate application with a network connection. Thus, the user may selectively apply URL targeting criteria, audience targeting rules, and membership threshold criteria that are appropriate for the application that content provider 120 is hosting.

Upon receiving information from the request, the processing logic may consume the web data file 151B representing the content experiment records and associated targeting criteria, such as URL targeting criteria, audience targeting rules, and membership threshold criteria. The processing logic may parse the web data file 151B and examine the targeting criteria for each content experiment.

For example, The processing logic may utilize URL targeting to compare the URL(s) indicated in the request to the URL(s) indicated by the URL targeting criteria for each content experiment to determine whether the request is directed to content having experiments. The processing logic may identify a set of experiments including each experiment on each web page that the processing logic identifies as having a matching URL to the URL of the request. In some embodiments, the processing logic may use simple matching, wherein a request URL be determined as matching a URL indicated in the URL targeting criteria even if the request URL has variations. Such variations may include changing a query parameter, changing a hash parameter, changing a protocol, or adding/removing "www" from the URL. In other embodiments, the processing logic may use exact matching which requires an exact match between the request URL and the URL specified in the URL targeting criteria. Still other embodiments may utilize substring matching, which may require matching specific strings of text within a URL. In some embodiments, if content provider 120 is operating in the context of a mobile application or a chat application (and not hosting a web site) for example, the URL targeting rules may instead be based on headers, IP addresses, cookies, flags, or URIs that determine where to deliver the associated content experiments, personalized experiences, or recommendations on the content providers mobile application or chat application.

The processing logic may also utilize audience targeting to determine which of the experiments in the identified set of experiments the visitor qualifies for. The processing logic may parse the web data file 151B and examine the audience targeting rules for each identified experiment. As discussed above, audience targeting rules describe criteria that visitors must meet to be part of the audience for that experiment and the audience targeting rules may include only a subset of the rules discussed above with respect to FIG. 1A (i.e. less rules than utilized in the browser context) because in the embodiment described here with respect to FIG. 1B, content provider 120 may operate in various contexts. The processing logic may determine which experiments' audiences the visitor is a member of based on information received in the request. For example, the processing logic may obtain the information from the request including a visitor ID, a query parameter (e.g., what music do they want to heat?), a location of the visitor and a language of the visitor among others. The processing logic may compare the information obtained from the request to the audience targeting rules for each identified experiment to determine which audience targeting rules the visitor matches or, stated differently, which experiments' audiences the visitor is a part of. In some embodiments, the processing logic may determine that the visitor is eligible for each experiment whose audience the visitor is a member of. In some embodiments, the information extracted from the request must match all of an experiment's audience targeting rules in order for the visitor be a member of the audience for that particular experiment. In other embodiments, a visitor may be a member of the audience for a particular experiment if the information extracted from the request matches a subset of that experiment's audience targeting rules. If there are no membership threshold criteria, then the visitor is eligible for each experiment that they are a member of the audience for.

In some embodiments, the processing logic may parse the web data file 151B and examine the membership threshold criteria for each content experiment that the visitor is an audience member of to determine if membership threshold criteria has been defined for those content experiments. The processing logic may parse the web data file 151B and examine the membership threshold criteria (if any) for each experiment that the visitor is an audience member of to determine if the limit on eligible users for any of the experiments has been reached. For those experiments for which the limit has been reached, the processing logic may determine that those experiments and any associated variations will not be shown to the visitor regardless of For those experiments for which the limit has not been reached, the processing logic may determine that those experiments and any associated variations will be shown to eligible visitors as described in further detail herein.

The processing logic also may determine which variations of each eligible experiment will be shown to the visitor by assigning the visitor to an experiment randomly, for example, using a hash based on the visitor ID and the experiment ID. As discussed above, an experiment may have 2 variations (A and B), and a %40 traffic allocation with 50/50 distribution among the variations, as well as a range of values ranging from 0-10000 assigned to it (stored in web data file 151B). For each eligible experiment, the processing logic may hash the visitor If) (obtained from the request) and the experiment ID (stored in web data file 151B) to an integer that falls within the range of values (e.g. 0-10000) assigned to that experiment. The processing logic may use any deterministic hash function such as Murmurhash to hash the experiment ID with the visitor ID. If the hash of the visitor ID with the experiment ID produces an integer in the range of 0-1999, the processing logic will assign the visitor to variation A. If the hash of the visitor ID with the experiment ID produces an integer in the range of 2000-3999, the processing logic will assign the visitor to variation B. If the hash of the visitor ID with the experiment ID produces an integer outside the range of 0-3999, the processing logic will may determine that the visitor is not eligible for the experiment. In this way, the processing logic may randomly determine which variations of each experiment the visitor is to be assigned to. Because the processing logic utilizes a deterministic hashing function, the hash of the experiment ID with the same visitor ID will produce the same integer that falls within the same range of values (e.g. 0-1999) and maps back to the same variation (e.g., variation A), as long as the conditions of the experiment (e.g., audience targeting rules, traffic allocation criteria etc.) do not change. Variation assignments that are consistently maintained may be referred to as "sticky" variation assignments.

Upon determining the content experiments and/or content experiment variations that are assigned to the visitor, at block 515 the processing logic may apply a hashing algorithm to the determined variations and generate a hash value representing the determined content experiments and/or content experiment variations that are assigned to the visitor. The processing logic may track the content experiment variations that it assigns to the visitor. For example, the processing logic may keep a record of the names of the content experiments and/or content experiment variations assigned to the visitor. Alternatively, the processing logic may track the unique ID(s) of the content experiments and/or content experiment variations assigned to a visitor, or hash value(s) for each experiment and/or content experiment variations based on the content of these experiment and variations, The processing logic may then apply a hashing algorithm to these records (e.g. to the list of names of the experiments and/or content experiment variations assigned to a visitor, to the unique IDs for these experiments and/or content experiment variations, or to the hash values for these items). When applying the hashing algorithm, the processing logic may also include other values, such as the visitor ID for the visitor. Thus, the processing logic generates a hash representing the determined content experiments and/or content item variations to be delivered to the Client Device in response to the request. The processing logic may alternatively apply the hashing algorithm, for example, to the content items themselves or, to their filenames, to the set of URLs or URIs that identify the content items, or to the snippet containing the instruction, code or configurations identifying which of the content item variations to be delivered to the destination computing device.

The processing logic may apply any appropriate hashing algorithm such as SHA-256. At block 520, the processing logic may store the hash (also referred to as "hash value") as a caching cookie, and at block 525, may transmit the caching cookie to the CDN 130 as well as to the user device 110. In some embodiments, at this point the determined variations may not be cached on the CDN 130 and thus the CDN 130 may in turn pass the caching cookie to the content provider 120. The content provider 120 may "unpack" the hash to determine which variations are indicated by the hash. Because the content provider 120 and edge node 150 may share the same hashing function or the same hashing key, the hashing function may be easily reversible. The content provider 120 may return all of the variations indicated in the cookie to the CON 130, resulting in CON 130 having a mapping of the cookie value to the variations assigned to the visitor as well as caching the variations returned by the content provider 120. In some embodiments where the processing logic is executing as part of the content provider 120, the processing logic may pass the caching cookie as well as all of the variations indicated in the cookie to the CDN 130 directly. When the visitor makes subsequent requests, the client device may pass the caching cookie value to the CDN 130 which has already cached the variants associated with the visitor. Thus, the particular content items for the client device may be retrieved from the CDN 130. Because the CDN 130 may cache only the variations to which the visitor or visitor group could be assigned, this in turn may reduce the amount of content to be cached for a set of content experiments (since variations irrelevant to the visitor are not cached). As a result, the percentage of requests served by the CDN 130 may be maximized even though the number of experiments and experiment variations being performed on the content provider 120 and thus the amount of content to cache) is simultaneously increasing as well.

In some embodiments, the user device 110 may store the caching cookie on the visitor's browser. Subsequently, when the visitor sends subsequent requests for the same content, those requests will include the caching cookie and the processing logic may automatically retrieve the experiment variants associated with the caching cookie. In some embodiments, the audience targeting rules are not "sticky," meaning the rule/condition is re-evaluated for the visitor on each new page load regardless of whether the experiment conditions have changed. For example, the visitor may meet the audience targeting rules and be included in the experiment early on. If the visitor returns later with a different browser or language setting that doesn't meet the experiment's audience targeting rules, they will no longer be eligible for the experiment. In some embodiments, only certain experiment conditions (e.g., the Ad Campaign and New/Returning Session audience targeting rules) may be sticky. In some embodiments, the audience targeting rules may be sticky as long as the variation experiment does not change.

In the embodiments discussed above, the processing operations may be accomplished by edge node 150. However, the processing steps may be performed by any computing device, such as a server or virtual machine. The computing device may be located at CDN, at the content provider, or in other parts of the networked system.

Figure 6:
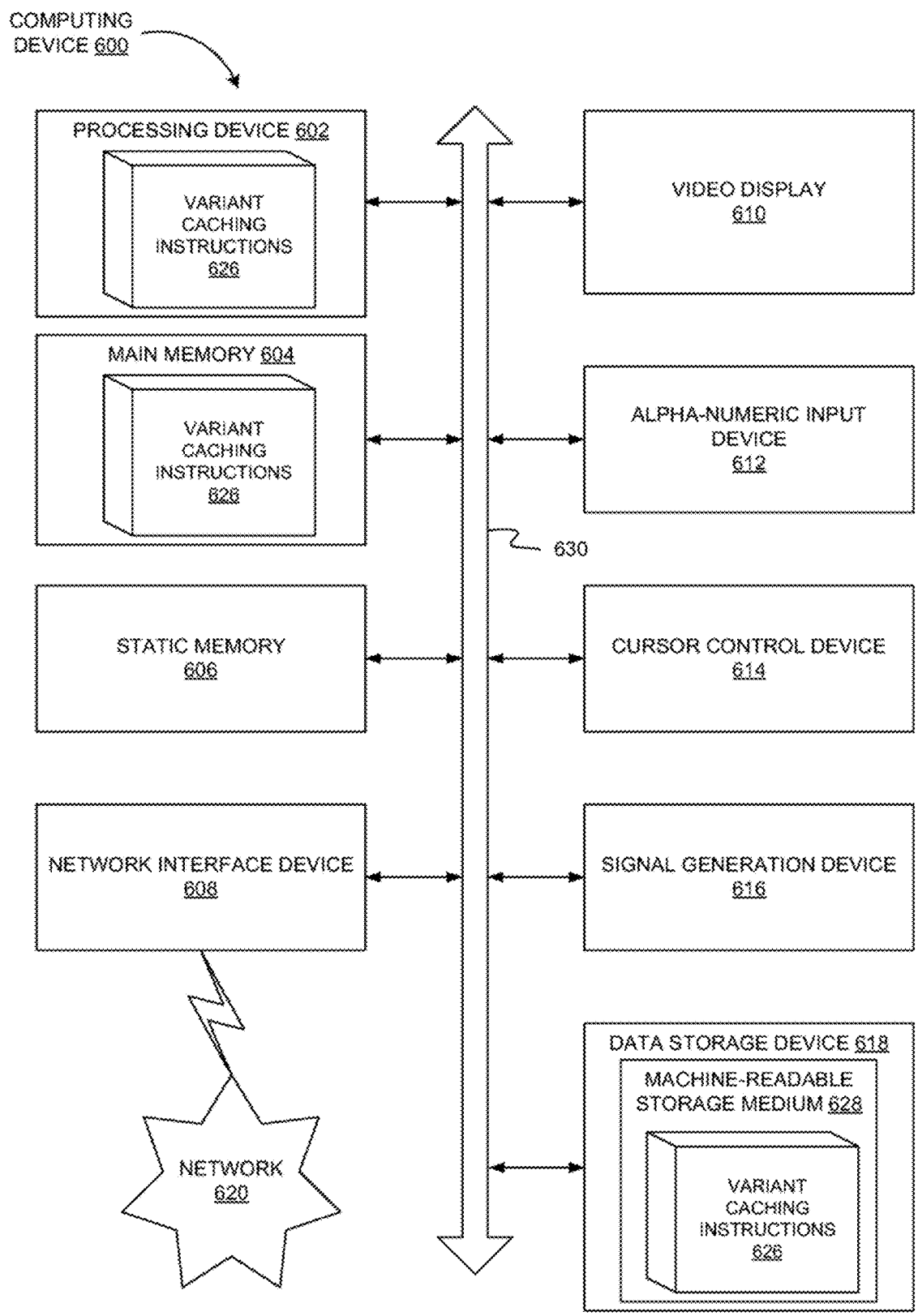
FIG. 6 is a block diagram of a computing device, in accordance with some embodiments of the present disclosure.

FIG. 6 is a block diagram of an example computing device 600 that may perform one or more of the operations described herein, in accordance with some embodiments. In various embodiments, computing device 600 may represent computing devices (e.g., servers) of the experimentation platform, third-party content provider client devices, and/or third-party content provider servers. Computing device 600 may receive, from a client device, a request for content hosted by a content provider device and determine a plurality of experiment variations running on the content provider device that the client device is allocated to. The computing device 600 may generate a hash of the plurality of experiment variations and store the hash as a cookie. The cookie may be transmitted to a content delivery network (CDN) of the content provider device to cache the plurality of experiment variations associated with the cookie at the CDN of the content provider device.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing it set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630. Main memory 604 may comprise a non-transitory computer-readable storage medium.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions, e.g., instructions for carrying out the operations described herein, in accordance with one or more aspects of the present disclosure. Variant caching instructions 626 may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, from a computing device, a request for content hosted by a content provider device;
determining, based on the requested content and targeting criteria to determine eligibility, one or more content experiments that the computing device is eligible to receive from a set of content experiments based on a visitor identification (ID) associated with the computing device, wherein the set of content experiments is associated with a plurality of content variations, wherein each of the plurality of content variations comprises a modification of positions within a control version web page of one or more items of content of the control version web page;

determining, for each of the one or more content experiments, one or more content variations to be cached by a caching server, wherein the one or more content variations are a subset that is less than all of the plurality of content variations;

generating a code snippet based on the one or more content variations, wherein the code snippet comprises code executable to perform the one or more content variations, and wherein an amount of the code of the code snippet is smaller than an amount of code to perform the plurality of content variations;

generating, by a processing device, a hash value, the hash value identifying the code snippet and storing the hash value, wherein the hash value is generated by a deterministic hashing function based on the one or more content variations and the visitor ID as inputs to the deterministic hashing function; and transmitting the hash value to the caching server as a cookie, wherein determining the one or more content variations comprises:

evaluating targeting criteria for each of the set of content experiments for the requested content;

determining the one or more content experiments for which the computing device is eligible from the set of content experiments; and randomly assigning, for each of the one or more content experiments for which the computing device is eligible, the one or more content variations to be cached by the caching server.

2. The method of claim 1, wherein the targeting criteria includes one or more of: a computing device type, a source the request originated from, cookies on the computing device, query parameters in the request, geographic location of the computing device, a language of the computing device, a URL, a uniform resource identifier, a header, a flag or an internet protocol (IP) address.

3. The method of claim 1, wherein determining, based on the requested content and the targeting criteria to determine eligibility, the one or more content experiments that the computing device is eligible to receive comprises:

receiving information from the computing device, wherein the information indicates characteristics of one or more of the request, the computing device, a user of the computing device, an application running on the computing device, or information stored on the computing device;

comparing the information to the targeting criteria to determine eligibility; and identifying the one or more content variations having targeting criteria that match the information.

4. The method of claim 1, wherein the request is received at an edge node.

5. A system comprising:
a memory to store a hash value; and
a processing device to:
receive, from a computing device, a request for content hosted by a content provider device;
determine, based on the requested content and targeting criteria to determine eligibility, one or more content experiments that the computing device is eligible to receive from a set of content experiments based on a visitor identification (ID) associated with the computing device, wherein the set of content experiments is associated with a plurality of content variations, wherein each of the plurality of content variations comprises a modification of positions within a control version web page of one or more items of content of the control version web page;

determine, for each of the one or more content experiments, one or more content variations to be cached by a caching server, wherein the one or more content variations are a subset that is less than all of the plurality of content variations;

generate a code snippet based on the one or more content variations, wherein the code snippet comprises code executable to perform the one or more content variations, and wherein an amount of the code of the code snippet is smaller than an amount of code to perform the plurality of content variations;

generate a hash value, the hash value identifying the code snippet and storing the hash value, wherein the hash value is generated by a deterministic hashing function based on the one or more content variations and the visitor ID as inputs to the deterministic hashing function; and transmit the hash value to the caching server as a cookie, wherein to determine the one or more content variations, the processing device is further to:

evaluate targeting criteria for each of the set of content experiments for the requested content determine the one or more content experiments for which the computing device is eligible from the set of content experiments; and randomly assign, for each of the one or more content experiments for which the computing device is eligible, the one or more content variations to be cached by the caching server.

6. The system of claim 5, wherein the targeting criteria includes one or more of: a computing device type, a source the request originated from, cookies on the computing device, query parameters in the request, geographic location of the computing device, a language of the computing device, a URL, a uniform resource identifier, a header, a flag or an internet protocol (IP) address.

7. The system of claim 5, wherein to determine, based on the requested content and the targeting criteria to determine eligibility, the one or more content experiments that the computing device is eligible to receive, the processing device is to:

receive information from the computing device, wherein the information indicates characteristics of one or more of the request, the computing device, a user of the computing device, an application running on the computing device, or information stored on the computing device;

compare the information to the targeting criteria to determine eligibility; and identify the one or more content variations having targeting criteria that match the information.

8. The system of claim 5, wherein the request is received at an edge node.

9. A non-transitory computer-readable storage medium including instructions that, when executed by a processing device, cause the processing device to:

receive, from a computing device, a request for content hosted by a content provider device;

determine, based on the requested content and targeting criteria to determine eligibility, one or more content experiments that the computing device is eligible to receive from a set of content experiments based on a visitor identification (ID) associated with the computing device, wherein the set of content experiments is associated with a plurality of content variations;

determine, for each of the one or more content experiments, one or more content variations to be cached by a caching server, wherein the one or more content variations are a subset that is less than all of the plurality of content variations, wherein each of the plurality of content variations comprises a modification of positions within a control version web page of one or more items of content of the control version web page;

generate a code snippet based on the one or more content variations, wherein the code snippet comprises code executable to perform the one or more content variations, and wherein an amount of the code of the code snippet is smaller than an amount of code to perform the plurality of content variations;

generate a hash value, the hash value identifying the code snippet, and store the hash value, wherein the hash value is generated by a deterministic hashing function based on the one or more content variations and the visitor ID as inputs to the deterministic hashing function; and transmit the hash value to the caching server as a cookie, wherein to determine the one or more content variations, the processing device is further to:

evaluate targeting criteria for each of the set of content experiments for the requested content;

determine the one or more content experiments for which the computing device is eligible from the set of content experiments; and randomly assign, for each of the one or more content experiments for which the computing device is eligible, the one or more content variations to be cached by the caching server.

10. The non-transitory computer-readable storage medium of claim 9, wherein the targeting criteria includes one or more of: a computing device type, a source the request originated from, cookies on the computing device, query parameters in the request, geographic location of the computing device, a language of the computing device, a URL, a uniform resource identifier, a header, a flag or an internet protocol (IP) address.

11. The non-transitory computer-readable storage medium of claim 9, wherein to determine, based on the requested content and the targeting criteria to determine eligibility, the one or more content experiments that the computing device is eligible to receive, the processing device is to:

receive information from the computing device, wherein the information indicates characteristics of one or more of the request, the computing device, a user of the computing device, an application running on the computing device, or information stored on the computing device;

compare the information to the targeting criteria to determine eligibility; and identify the one or more content variations having targeting criteria that match the information.

* * * * *